F. D. CARRICO.
STEERING GEAR.
APPLICATION FILED MAR. 25, 1916.

1,256,873.

Patented Feb. 19, 1918.
2 SHEETS—SHEET 1.

Inventor
FRANK D. CARRICO.

Witness

F. D. CARRICO.
STEERING GEAR.
APPLICATION FILED MAR. 25, 1916.

1,256,873.

Patented Feb. 19, 1918.
2 SHEETS—SHEET 2.

Inventor
FRANK D. CARRICO.

Witness
Ernest B. Leisner

By Charles E. Vissey
Attorney

UNITED STATES PATENT OFFICE.

FRANK D. CARRICO, OF HAMTRAMCK, MICHIGAN, ASSIGNOR OF ONE-HALF TO JOHN H. NEARY, OF DETROIT, MICHIGAN.

STEERING-GEAR.

1,256,873.  Specification of Letters Patent.  Patented Feb. 19, 1918.

Application filed March 25, 1916. Serial No. 86,776.

*To all whom it may concern:*

Be it known that I, FRANK D. CARRICO, a citizen of the United States, residing at Hamtramck, county of Wayne, State of Michigan, have invented a certain new and useful Improvement in Steering-Gears, and declare the following to be a full, clear, and exact description of the same, such as will enable others skilled in the art to which it pertains to make and use the same, reference being had to the accompanying drawings, which form a part of this specification.

This invention relates to steering gears of the worm and traveling nut type for use with motor vehicles and its object is a device for the purpose in which wear may be wholly taken up from the outside of the case and the parts adjusted in proper relation for use. In the manufacture of the usual gears of this type, the traveling nuts must be accurately machined as to length in order to fit the respective positions on the worm. By means of the adjusting features, hereinafter more fully described, such accurate machining as to length is avoided as the means employed in adjusting the parts for wear enables the nuts to be set in their necessary respective position. An object of the invention, therefore, is a device in which the parts may be originally assembled for use by adjusting from the exterior of the case. A further object of the invention is a steering gear having traveling nuts and a split trunnion, or two half trunnions, engaging the rock arm, the said two half parts thereof being engaged by the two nuts respectively, enabling the wear to be taken up by forcing the parts thereof together as hereinafter shown. Another object of the invention is a steering gear of the type stated that is comparatively inexpensive to manufacture, simple in form and efficient in operation. These and other objects and the several novel features of the invention are hereinafter more fully described and claimed and shown in the accompanying drawings in which—

Similar characters refer to similar parts throughout the drawing and specification.

Figure 2:
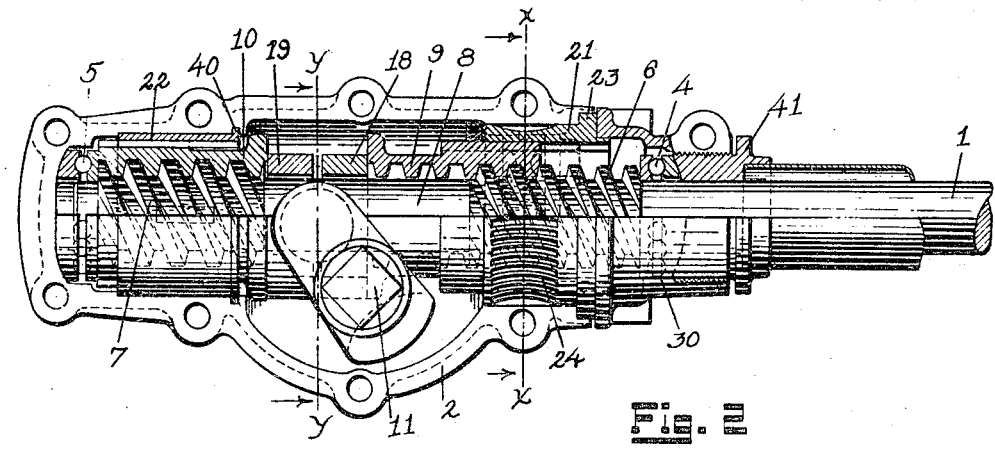
Fig. 2 is an elevation and half longitudinal section taken on line x—x of Fig. 1, one-half of the casing being removed.

1 indicates the lower end of the steering rod to the upper end of which is attached the usual steering wheel (not here shown). The shaft is rotatably mounted in a split casing 2 secured together by bolts 3, 3, etc. Thrust bearings 4 and 5 are provided at each end of the shaft whereby friction is reduced to a minimum. Within the case the shaft 1 is provided with screw threaded portions 6 and 7 similar in form and spaced apart as shown, leaving the central portion 8 substantially of the diameter of the rod 1. The nut 9 engages the screw threads 6 and a similar nut 10 engages the screw threads 7. These two sets of screw threads are formed at the same angle and pitch so that rotation of the rod moves both nuts simultaneously and to the same extent in the same direction, either forward or reverse depending upon the direction of rotation of the rod.

Figure 1:
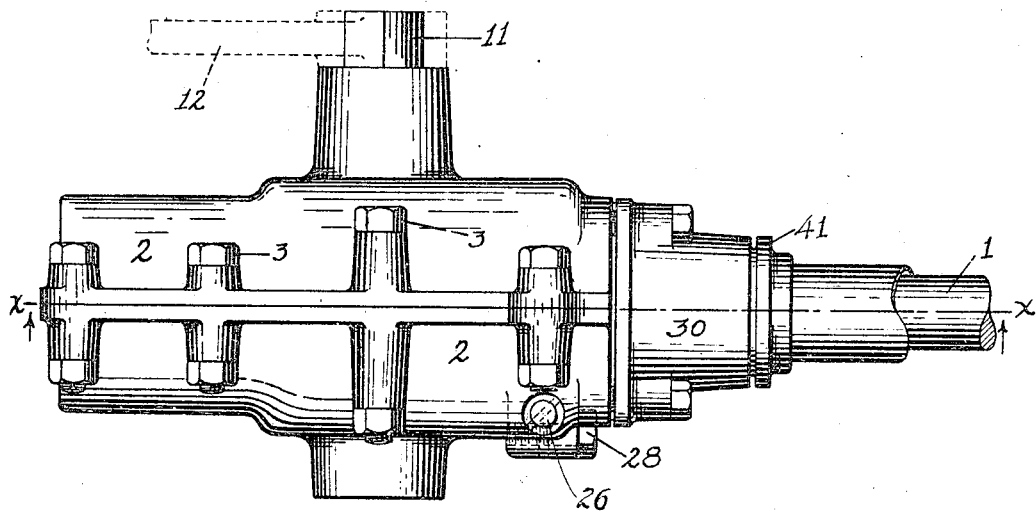
Figure 1 is a plan view of the exterior of a steering gear embodying my invention.
Figure 4:
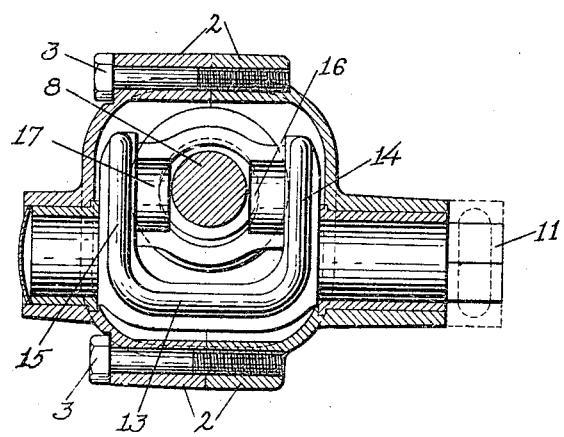
Fig. 4 is a cross-section taken on line y—y of Fig. 2.

A rock shaft 11 is carried in the case at a right angle to the steering shaft 1 and one end of the rock shaft projects from the casing and is preferably squared as indicated in Figs. 2 and 4 to receive the usual rock arm 12 indicated by dotted lines in Fig. 1. This rock arm is connected in the usual manner with the steering wheels. As shown more clearly in Fig. 4, the rock shaft is formed with a yoke 13 having arms 14 and 15 preferably formed integral therewith. These arms are provided with the usual round studs 16 and 17 respectively. The trunnion block 18 has a half bearing formed in opposite ends to receive these studs 16 and 17 and a similar block 19 is of exactly similar formation so that these studs are engaged by each block, the trunnion bearing in each half block being slightly less than one-half the diameter of the stud 16 or 17 so that the two blocks 18 and 19, when assembled, are spaced apart by the studs as shown in Fig. 2. As the trunnions or the studs become worn in use these blocks 18 and 19 as is hereinafter shown may be set closer together to take up the wear.

Figure 3:
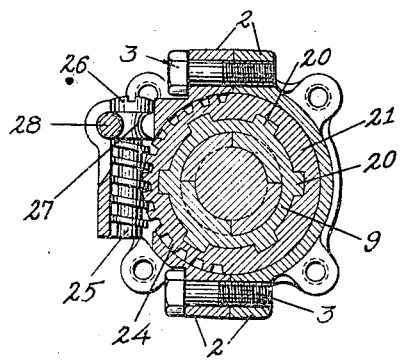
Fig. 3 is a cross section taken on line x—x of Fig. 2.

The nuts 9 and 10 each have an end engaging these trunnion blocks respectively, and both the nuts 9 and 10 as may be understood from Figs. 2 and 3, are formed with keys 20 on the exterior surface thereof which ride in ways formed in a bushing 21 for the nut 9 and a bushing 22 for the nut 10. With the bushings held from rotation relative to the case, as is hereinafter shown, rotation of the rod 1 causes longitudinal movement of the nuts 9 and 10 on the threads by which movement the shaft 11 is rocked in its bearings as may be readily understood.

The bushing 21 is provided with a circumferential flange 23 at one end thereof engaging the end of the casing and a housing 30 is bolted to said casing end thus binding the flange 23 between the casing end and the end of the housing. The bushing is thus held in position and longitudinal movement thereof prevented. The exterior central portion of the bushing 21 is provided with the worm threads 24 and a worm 25 is mounted for rotation in a boss formed on the side of the case, as indicated in Figs. 1 and 3, engaging these worm threads 24. This worm 25 is provided with a head 26 slotted to enable it to be turned by a screw-driver and is also provided with contracted neck portion 27. As may be understood from Fig. 1, the housing or boss for the screw 25 is split and a bolt 28 is provided at one end of the casing which, as may be understood from Fig. 3, engages in this contracted portion 27 of the worm preventing longitudinal movement thereof in the boss and also binding the worm 25 to hold it from accidental rotation.

In assembling the parts the nut 10 may be set at the desired position longitudinally of the shaft 1 with the trunnions in place on the studs 16 and 17 whereupon the nut 9 may be set up to engage the trunnion 18 by turning the screw 25. The screw 25 may then be locked from rotation by the bolt 28 and the parts are then in the position required for use. The housing 30 frictionally engaging the flange 23 to some extent relieves the thread of the worm and the teeth 24 of strain. The bushing 22 is quite similar in form to the bushing 21 being provided with a circumferential flange 40 at one end, as shown in Fig. 2, engaging in a recess formed in each half of the casing 2 so that when the cases are secured together the bushing is effectively held from movement longitudinally of the shaft. It is to be noted that the bushing fits accurately in the casing and it is to be understood (although not shown) that the bushing is keyed to the case in the same general manner as a wheel to a shaft to prevent rotation of the bushing in the case. The exterior surface of the bushing 22 is plain and differs from the bushing 21 in not being provided with the worm teeth.

As heretofore stated thrust bearings 4 and 5 are provided at each end of the case, each engaging against the end of the worm threads 6 and 7 respectively, and endwise movement of the shaft 1 in the case may be taken up by the adjusting nut 41 in threaded relation with the housing 30.

As shown in Fig. 3, the worm teeth 24 are not cut entirely about the circumference of the bushing 21, as the possible adjustments required are not such as to necessitate more than a half circumference of the bushing being so provided with teeth. However teeth may be cut entirely about the circumference of the bushing if so desired, such arrangement being serviceable in assembling as the setting of the bushing in any particular relation with the worm or screw 25 is avoided.

From the foregoing description it becomes evident that the required machining of the casing to receive the various parts is reduced to a minimum, being mainly that of providing bearings for the two bushings about the screw-shaft and bearings for the rock shaft, and that the various parts are so designed as to involve but little labor in the assembling of the parts as the adjustments provided enable inaccuracies in machining to be compensated for, labor cost is thus reduced to a minimum. Furthermore the device is not only efficient in operation but is very convenient in use as all wear may be readily taken up from the exterior of the case and without disassembling the parts, and that all loose parts frequently used in similar devices, such as shoes etc. to take up wear are dispensed with.

Having thus briefly described my invention, its utility, and mode of operation, what I claim and desire to secure by Letters Patent of the United States is—

1. In a device of the character described, a casing, a screw shaft therein, adjustable means for holding the shaft from longitudinal movement therein, nuts on the screw shaft spaced one from the other, a rock shaft mounted in the casing transversely of the screw shaft and adapted to be rocked by movement of the nuts longitudinally of the screw shaft, the nuts being normally held from rotation with the shaft, a worm gear by rotation of which one of said nuts may be turned relative to the shaft, and a worm operable from the exterior of the case engaging the worm gear.

2. In a device of the character described, a casing, a screw shaft mounted for rotation therein, a pair of nuts on the screw shaft spaced one from the other and normally held from rotation with the shaft, a rock shaft mounted in the casing transversely of the screw shaft adapted to be rocked by movement of the nuts longitudinally of the screw shaft, a bushing for each of the nuts to which the nuts are splined respectively, and means for relatively adjusting the nuts consisting of a worm operable from the exterior of the casing, and a worm gear formed on the exterior face of one of the bushings engaged by the worm.

3. In a device of the character described, a casing, a screw shaft mounted for rotation therein, a pair of nuts mounted on the screw shaft, a rock shaft mounted in the casing transversely of the screw shaft and having a portion projecting between the ends of the nuts whereby movement of the screw shaft rocks the rock shaft, a bushing for each of the nuts and to which the nuts are splined, the bushings being supported by the casing and being held from rotative movement, both of said bushings also being held from movement longitudinally of the shaft, one of said bushings being provided with gear teeth, means rotatably mounted in the casing engaging said teeth, and releasable means for holding said rotatable means from rotation.

4. In a device of the character described, a casing, a screw shaft mounted for rotation therein, adjustable means at one end of the casing for preventing longitudinal movement of the screw shaft, nuts on said screw shaft spaced one from the other, a bearing block between the adjacent ends of the nuts, a rock shaft mounted in the casing transversely of the screw shaft having arms formed to engage the bearing block whereby longitudinal movement of the nuts on the shaft rocks the rock shaft, a bushing for each of said nuts to which the nuts are splined respectively, said bushings being normally held from rotation in the casing, and means for turning one of said nuts substantially as and for the purpose described.

5. In a device of the character described, a casing, a screw shaft mounted for rotation therein having threads equidistantly spaced from the center of the casing on each side thereof, a nut on each of said threaded portions, a bushing for each of said nuts having ways formed longitudinally thereof to receive keys formed on the nuts, means for holding the bushings from rotation, one of said bushings having a circumferential flange and the casing being grooved to receive the flange, the other of said bushings having a similar flange engaging the end of the casing, a housing adapted to be bolted to the casing end and frictionally engage the flange on the bushing, an adjusting nut carried by the housing, an anti-friction bearing between the nut and adjacent screw threaded portion of the shaft whereby said adjusting nut may be set to prevent longitudinal movement of the shaft in the casing, and means for turning one of said bushings to set up the nut carried thereby to take up wear substantially as described.

6. In a device of the character described, a casing, a screw shaft rotatably mounted therein, a pair of nuts spaced apart on said shaft normally held from rotation therewith and adapted to move longitudinally of the shaft, a block on adjacent faces of each of the nuts, a rock shaft mounted in the casing transversely of the screw shaft having arms extending each side of the screw shaft and provided with studs projecting between the adjacent ends of the nuts, each block having a bearing on opposite sides of the screw shaft for the studs respectively, each bearing being less than one-half the diameter of the stud in each instance whereby, when the parts are assembled, the blocks are spaced apart by the studs, and means for setting up one of the nuts to take up wear at the bearing points.

7. In a device of the character described, a casing, a screw shaft rotatable therein, a pair of spaced nuts on the shaft, one of said nuts being fixedly held from rotation therewith, and the other of said nuts being adjustably held from rotation therewith, and a rock shaft having a portion positioned between the nuts and adapted to be rocked by movement of the nuts longitudinally of the shaft.

8. In a device of the character described, a casing, spaced nuts therein, a shaft having screw portions rotatable therewith with which said nuts engage respectively, a rock shaft having a portion positioned between the nuts and adapted to be rocked by movement of the nuts longitudinally of the screw shaft, and means for rotatively adjusting one of the nuts relative to the other for the purpose described.

9. In a device of the character described, a casing, spaced nuts therein, a shaft having screw portions rotatable therewith with which the said nuts engage respectively, bearing blocks between the nuts, a rock shaft having portions engaging the blocks whereby movement of the nuts longitudinally of the screw shaft rocks the rock shaft, means for holding one of the nuts from rotation with the shaft, and adjustable means for holding the other of said nuts, said adjustable means being operable from the exterior of the case to rotate the said nut relative to the other to take up wear in the bearing blocks.

10. In a device of the character described, a casing, a screw shaft rotatable therein, a pair of spaced nuts on the shaft, one of said nuts being fixedly held from relative rotation therewith, and the other of said nuts being rotatively adjustable therewith and normally held from rotation, a pair of blocks, each engaging one of the nuts between adjacent ends thereof, said blocks having bearing portions, and a rock shaft having studs engaging the said bearings and holding the nuts in spaced relation.

11. In a device of the character described, a casing, a shaft having two integrally formed screw portions thereon spaced one from the other, the shaft being rotatably mounted in the casing, a nut on each threaded portion of the shaft, a rock shaft having a portion extending between the nuts and adapted to be rocked by movement of the nuts longitudinally of the screw shaft, said nuts being normally held from rotation with the shaft, and means for rotatively adjusting one of the nuts to take up wear.

In testimony whereof, I sign this specification.

FRANK D. CARRICO.